United States Patent [19]

Aaserude

[11] 4,455,006
[45] Jun. 19, 1984

[54] APPARATUS FOR HANGING LANTERNS FROM VEHICLES

[76] Inventor: Gordon V. Aaserude, 444 La Paloma Rd., El Sobrante, Calif. 94803

[21] Appl. No.: 382,381

[22] Filed: May 27, 1982

[51] Int. Cl.³ .............................................. F16B 47/00
[52] U.S. Cl. .................................. 248/205.5; 248/538; 248/480; 248/213.2
[58] Field of Search ................ 248/206 R, 202.1, 208, 248/205.1, 205, 205.2, 205.3, 213.2, 213.4, 213.6, 480, 486, 485, 487; 224/331; 211/86

[56] References Cited

U.S. PATENT DOCUMENTS

| | | |
|---|---|---|
| 234,045 | 11/1880 | Lufkin . |
| 766,028 | 7/1904 | Fisher et al. . |
| 1,145,091 | 7/1915 | Stromstad . |
| 1,523,042 | 1/1925 | Thomas ...................... 48/538 X |
| 1,622,057 | 3/1927 | Senter . |
| 2,552,074 | 5/1951 | Thompson ..................... 248/213.2 |
| 2,696,357 | 12/1954 | Elmer ................................. 248/221 |
| 3,142,469 | 7/1964 | Clemmer ........................ 248/480 X |
| 3,166,199 | 1/1965 | Hawkins et al. ................... 248/538 |
| 3,178,144 | 4/1965 | Kimoto ............................... 248/229 |
| 3,341,163 | 9/1967 | Honig .................................. 248/291 |
| 3,366,296 | 1/1968 | Feinstein et al. ................... 224/331 |
| 3,482,811 | 12/1969 | Zent .............................. 248/485 X |
| 3,998,418 | 12/1976 | Boulanger . |

Primary Examiner—Ramon S. Britts
Assistant Examiner—Sarah A. Lechok
Attorney, Agent, or Firm—Limbach, Limbach & Sutton

[57] ABSTRACT

The present invention is an apparatus for hanging lanterns from vehicles comprising an elongated bracket arm having a securing means disposed at a first end for cooperation with the first end to rigidly attach the bracket arm to the vehicle, a rod having a first end with means thereon disposed for resiliently contacting a side of the vehicle and having a portion of the rod engaging a second end of the bracket arm remote from the first end and a support means disposed between the bracket arm and rod for supporting at least the first end of the rod.

3 Claims, 4 Drawing Figures

APPARATUS FOR HANGING LANTERNS FROM VEHICLES

BACKGROUND OF THE INVENTION

In the past, it has been desirable to hang lanterns from vehicles for a myriad of uses. Apparatuses for hanging lanterns from modern vehicles, such as automobiles, recreational vehicles, trucks, vans, etc., are still desirable. These hangers are used during camping and other outdoor activities when light is needed away from the vehicle. However, the lantern hangers of the past usually required special structural additions to the vehicle for their attachment. Lantern hangers of the past could not be quickly assembled or disassembled nor could they be mounted to the side of a vehicle such that they would not mar or damage the painted finish. The lantern hangers of the past were not practical for use on modern vehicles.

The present invention overcomes the problems of the past and provides a lantern hanging apparatus for mounting on the side of a vehicle that can be quickly assembled and disassembled and not mar the painted finish of the vehicle.

SUMMARY OF THE INVENTION

The present invention is an apparatus for hanging lanterns from the side of a vehicle. It is adaptable for mounting to the roof gutter system or windows of the vehicle. It can be quickly assembled and disassembled. It will not mar the painted finish of the vehicle when mounted.

The preferred embodiment of the invention comprises a bracket arm with an end shaped to fit over the upstanding rim of the roof gutter system, a clamp that connects to and cooperates with the bracket arm to rigidly attach the arm to the gutter system, an adjustable rod that contacts the side of the vehicle with one end and has a second end which extends through the bracket arm in a locking relationship, and a supporting strap or rod which extends between the bracket arm and adjustment rod to support the end of the rod that contacts the side of the vehicle.

In a second embodiment, the bracket arm is adaptable to be mounted to a window of the vehicle. In this embodiment, an additional member is connected to the end of the bracket arm and the member is shaped to fit snugly over the top edge of the window. When the window is wound up, the member is locked in position by the top edge of the window and the window receptacle in the door of the vehicle.

In the preferred embodiment, the bracket arm has three sections. The sections are an end section, shaped to fit over the upstanding rim of the gutter system, a rigid section that is connected to the end section, and a flexible section that is connected to the rigid section. The adjustable rod extends through the flexible section of the arm. Because of the angular displacement of the bracket arm and rod, the rod is locked into the flexible section of the arm when the apparatus is mounted to the vehicle.

The locking relationship between the arm and rod is not permanent. The flexible section of the arm can be manually flexed to release the adjustable rod so it can be lengthened or shortened. When the desired length is reached, the flexible section will be allowed to spring back to its normal position that will lock the adjustable rod once again.

An object of the invention is to provide a lantern hanging apparatus for vehicles for mounting to the gutter system or window of a vehicle.

A still further object of the invention is to provide a lantern hanging apparatus which is easily attachable to and detachable from a vehicle and will not mar or damage the painted finish of a vehicle.

Another object of the invention is to provide a lantern hanging apparatus that has a bracket arm that can lock an adjustable rod carrying a lantern at different lengths.

DETAILED DESCRIPTION OF THE DRAWINGS

Figure 1:
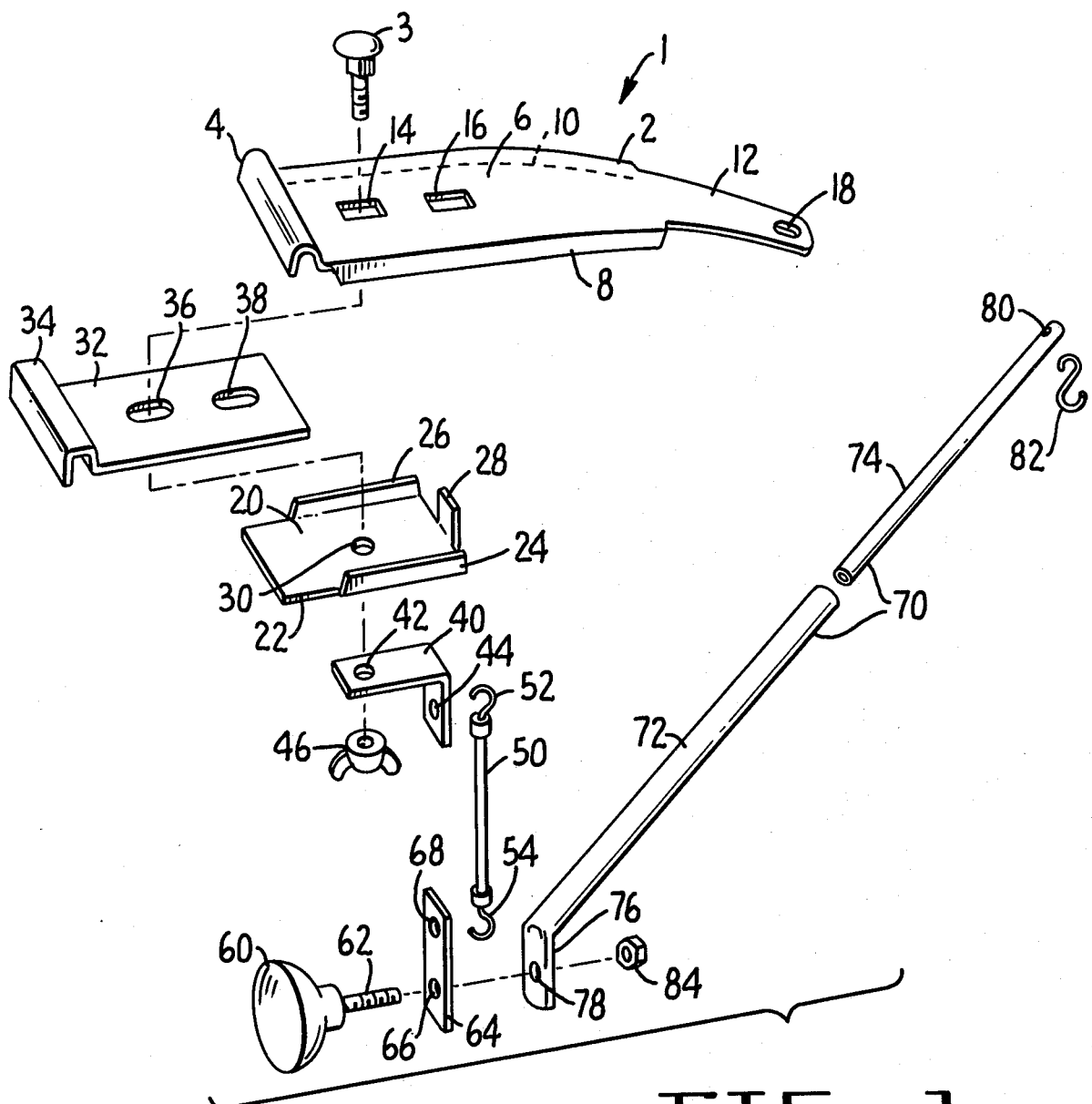
FIG. 1 shows an exploded view of the apparatus of the invention.

Referring to FIG. 1, the apparatus of the invention is generally shown at 1. The main elements of the primary embodiment of the apparatus are bracket arm 2, clamp 20, support strap or rod 50, and adjustable rod 70.

The apparatus can be viewed in two portions. The upper portion consists of bracket arm 2, clamp 20, and upper clip 40. The upper portion elements are connected by bolt 3 and wing nut 46. The upper portion secures the apparatus to the gutter system of the vehicle. The lower portion consists of adjustable rod 70, lower clip 64, and suction cup 60. The lower portion elements are connected by bolt 62 disposed on the back side of the suction cup and nut 84. The bracket arm 2, clamp 20, clips 40 and 64, and rod 70 can be constructed of any suitable material such as sheet metal or thermoplastic. However, the material from which these elements are constructed is not limited to those named.

The ends of upper and lower portions that contact the vehicle are connected by strap 50. The ends of the strap connect to the upper and lower clips 40 and 64. The strap 50 is the means for supporting the lower portion from the upper portion. This is fully described in the subsequent paragraphs.

Preferably, bracket arm 2 is of single piece construction. The arm has three sections, the end section 4, central rigid section 6, and flexible end section 12. Although the bracket arm is preferably of single piece construction, each section can be an individual piece joined by suitable connecting means.

End section 4 has an inverted "U" shape. This shape enables it to fit easily over the upstanding rim of the vehicle gutter system. This section forms the first end of the arm 2. The end section 4 cooperates with clamp 20 to rigidly attach the arm to the gutter system, as will be described subsequently.

Rigid section 6 is the main strength member for supporting the remainder of the apparatus and the lantern attached to the apparatus. Section 6 has disposed along its opposing side edges members 8 and 10, respectively. Members 8 and 10 are disposed at substantially 90° to the planar surface of section 6 to prevent any flexing of section 6.

Section 12 extends from rigid section 6. Section 12 is flexible. Section 12 forms the second end of arm 2. This section has orifice 18 disposed through it at the end remote from the point of attachment to section 6. The orifice 18 is used to lock the adjustable rod within it at any desired length, as will be described subsequently.

The planar surface of section 6 has rectangular orifices 14 and 16 disposed through it. The orifices are spaced apart and aligned longitudinally with orifice 14 being closer to end section 4 than 16. Orifice 14 receives carriage bolt 3. Bolt 3 has a square section below the head that fits into orifice 14. The bolt 3 cannot rotate in orifice 14 because of the square section of the bolt that is approximately the width of orifice 14. However, the bolt can freely slide along the longitudinal length of the orifice for the purpose of adjusting the bracket arm to attach to a particular gutter system.

Orifice 16 is for aiding in the alignment of clamp 20 with arm 2. It receives tab 28 of clamp 20 therethrough. The confinement of tab 28 in orifice 16 and the passage of bolt 3 through orifice 14 of arm 2 and orifice 30 of clamp 20 ensures alignment of the clamp with bracket arm 2.

Clamp 20 has a width such that it will fit between members 8 and 10 disposed along the side edges of section 6. The clamp has members 24 and 26 disposed at 90° along its side edges which maintain a minimum spacial distance between the planar surface of section 6 of arm 2 and the planar surface of clamp 20. Along the back edge of clamp 20, tab 28 is disposed at 90° from the planar surface. The tab has a height greater than either member 24 or 26. The width of tab 28 is less than the width of orifice 16 so it can access the orifice when the apparatus is assembled. Front end 22 of clamp 20 has a length such that it can extend under the bottom of the gutter system and it cooperates with the bracket arm 2 to rigidly attach the arm to the gutter system when wing nut 46 is tightened on bolt 3.

Clip 40 is "L" shaped and part of the upper portion. It has orifice 42 for receiving bolt 3 therethrough and orifice 44 for receiving a portion of support strap 50.

Figure 2:
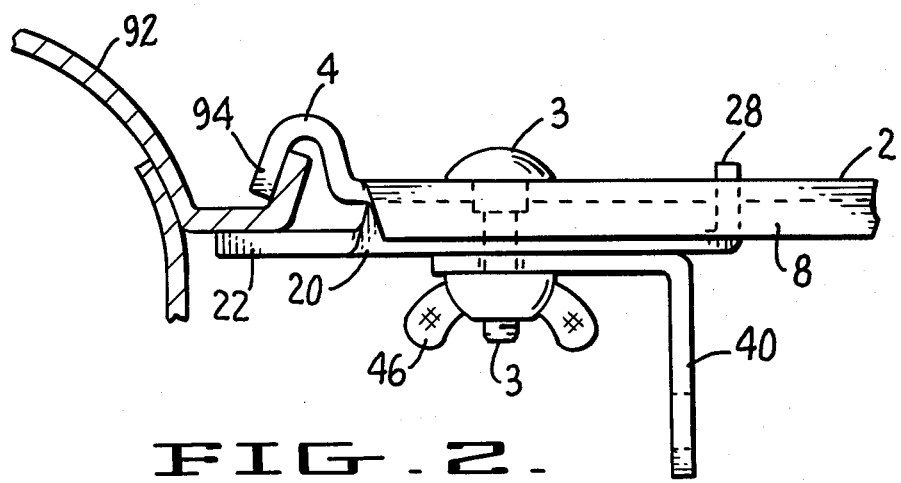
FIG. 2 shows the method of attachment of bracket arm to a roof gutter system of a vehicle.

Referring to FIGS. 1 and 2, the method of connection of the apparatus to a gutter system is shown. End section 4 of bracket arm 2 fits over upstanding rim 94 attached to vehicle 92. Bolt 3 is passed through orifice 14 of the bracket arm, orifice 30 of clamp 20, and orifice 42 of clip 40. Wing nut 46 then threadably engages the end of bolt 30 to connect the elements. For alignment of clamp 20 within arm 2, tab 28 is disposed through orifice 16 of the arm as previously described.

As wing nut 46 is tightened on bolt 3, end 22 of clamp 20 contacts the bottom of the gutter system. When the wing nut is fully tightened, end section 4 of arm 2 and end 22 of clamp 20 securely clamps the upper portion of the apparatus to the gutter system.

End section 4 of arm 2 and end 22 of clamp 20 are coated with vinyl or other suitable material. The coating will prevent any damage to the painted finish of the vehicle 92 when the apparatus is mounted.

Referring to FIG. 1, adjustable rod 70 has two telescoping sections in the preferred embodiment. Upper section 74 telescopes into lower section 72. Lower section 72 has angled end 76. End 76 has orifice 78 disposed therethrough for receiving the connecting means from suction cup 60 that contacts the side of the vehicle, as will be subsequently described.

Upper section 74 has orifice 80, disposed therethrough, near the end. The orifice receives "S" hook 82, from which a lantern is hung.

End 76 of rod 70 has suction cup 60 connected to it by a method to be described. The suction cup is constructed of a material such as rubber, polyvinyl resin, or thermoplastic, which will not mar or damage the painted finish of the vehicle. Suction cup 60 has bolt 62 disposed from the back side. Bolt 62 and nut 84 connect suction cup 60 to lower clip 64 and adjustable rod 70 through orifices 66 and 78, respectively.

Figure 3:
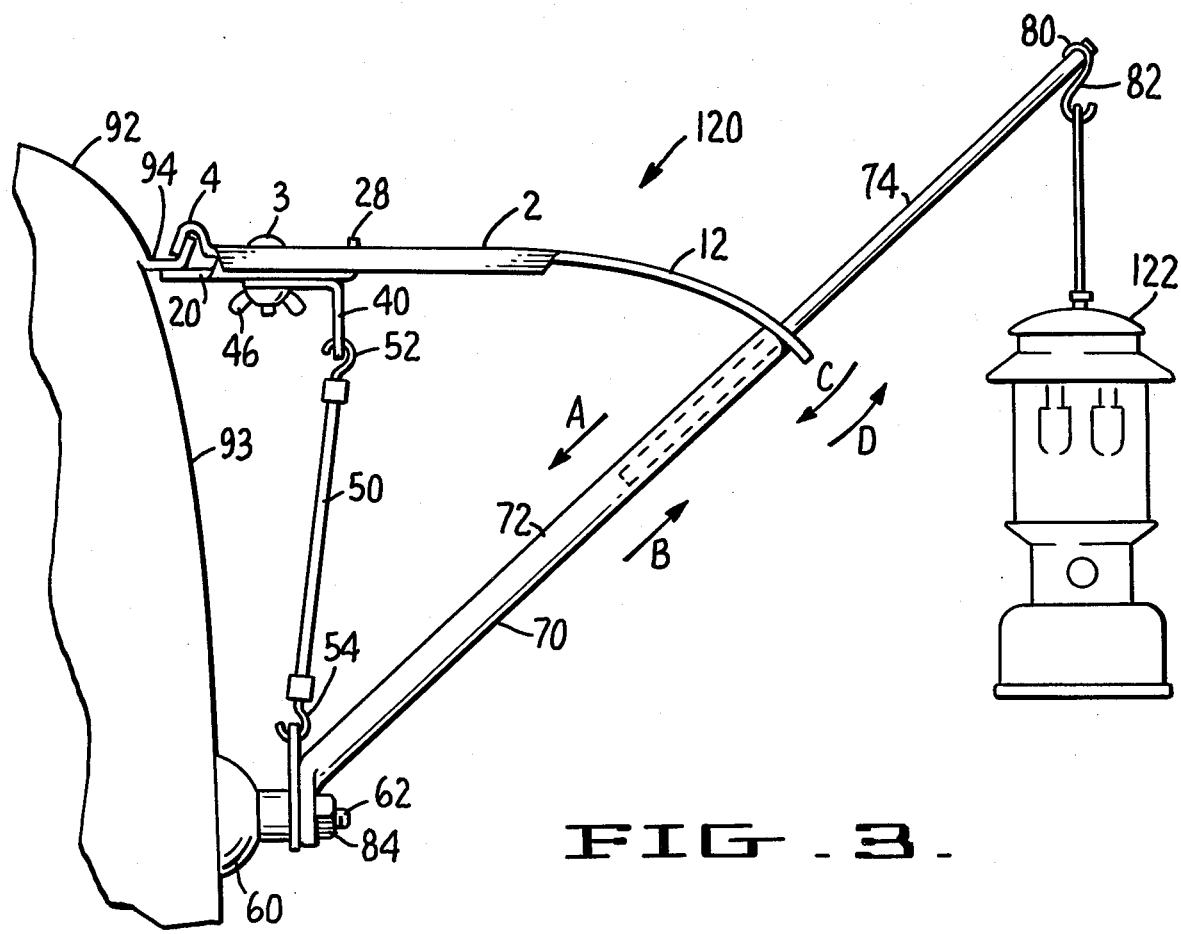
FIG. 3 shows the method of attachment of the bracket arm to a window of a vehicle.

The lower portion of the apparatus is supported by the upper portion of the apparatus in two ways. First, the ends of the lower and upper portions which contact the vehicle have strap 50 disposed between them. Strap 50 has hooks 52 and 54 disposed at the respective ends. Hook 52 is received by orifice 44 of upper clip 40 and hook 54 is received by orifice 68 of lower clip 64, thus, providing support to the lower portion. The strap 50 can be a flexible strap or rigid rod. The shape of the side of the vehicle will determine whether the flexible strap or rigid rod is used. Second, flexible section 12 of bracket arm 2 has section 74 of the adjustable rod disposed through it (FIG. 3). This supports the other end of the rod 20.

Referring to FIG. 3, the apparatus of the invention is shown attached to the side of vehicle 92. Section 74 of adjustable rod 70 can telescope in direction "A" or "B" in section 72. Only section 74 of the adjustment rod passes through orifice 18 (FIG. 1) of flexible section 12 of arm 2, not Section 72. Flexible section 12 when allowed to spring in direction "D" will lock section 74 of the rod so that it cannot telescope in direction "A" or "B". The locking is accomplished by diametrically opposing side edges of orifice 18 contacting points on opposite sides of section 74. Once locked by flexible section 12 of the arm, the length of the rod will remain the fixed until changed by other actions.

When it is desired to change the length of the rod, flexible section 12 is biased in direction "C" to free the locking contact of section 12 on section 74. Once biased in direction "C", section 74 can be freely telescoped in direction "A" or "B" to change the length of the rod. When the desired length is obtained, section 12 or arm 2 is allowed to spring back to its original position and lock section 74 within it. This will allow lantern 122 to be positioned any desired distance from the end of section 72 of adjustment rod 70.

Figure 4:
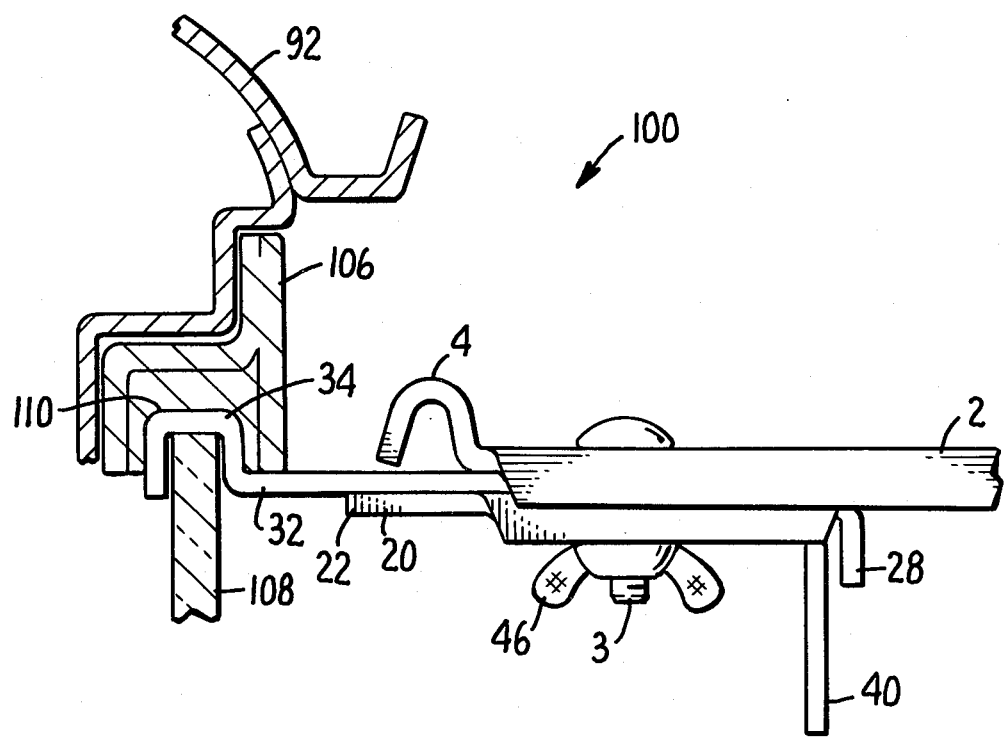
FIG. 4 shows the apparatus of invention attached to a vehicle.

Referring to FIG. 4, the second embodiment of the invention is shown generally at 100. In the second embodiment arm 2 is attached to a window of the vehicle. In this embodiment, mount 32 (FIGS. 1 and 4) is disposed between bracket arm 2 and clamp 20 when the upper portion of the apparatus is assembled. The mount 32, as shown in FIG. 4, will extend beyond end 22 of clamp 20 and end section 4 of arm 2. When mount 32 is used, clamp 20 is flipped over so that the planar surface of the clamp is adjacent to the mount 32.

Mount 32 has orifices 36 and 38 disposed therethrough. Either orifice arm receives bolt 3 therethrough. The orifice chosen for use will depend upon the relationship between the window, to which it will be mounted, and the window receptacle of the vehicle. The plurality of orifices provide a way to adjust the positioning of the mount 32.

Mount 32 has end 34, which has an inverted "U" shape. It is shaped to fit snugly over the top of a vehicle window 108. It is constructed of thin rigid material so that when the window 108 is wound up it will fit into the window receptacle 110 of door 106 over the window and not damage the receptacle. The remainder of the apparatus in the second embodiment is as previously described for the primary embodiment.

The inventor contemplates the invention to be all that is shown, described and claimed in the foregoing application. However, there can be various adaptations and variations of the present invention, therefor, the inventor contemplates the invention to all that is shown, described and claimed to be the invention and all equivalents thereto.

I claim:

1. An apparatus for hanging an item from a vehicle comprising:
   A. a bracket arm comprising: (1) at a first extreme end thereof means for attaching said bracket arm to a gutter of a roof of said vehicle, (2) a central portion connected to said first extreme end, and (3) a second extreme end connected to said central portion and being characterized as being relatively flexible as contrasted to said central portion and possessing an orifice therethrough proximate its end remote from said central portion; and
   B. rod means which, at one end thereof, is connected to means for attaching said rod to a side wall of the vehicle below said gutter and the remote end thereof possessing means for attachment of said rod to an item to be hanged, said rod means being caused to pass through said orifice contained in said second extreme end of said bracket arm; and
   C. a support strap functionally connected to said central portion of said bracket arm at its first extremity and to said rod means at its other extremity.

2. The apparatus of claim 1 wherein further means are connected to said bracket arm at said first extreme end for connecting said first extreme end to a window of said vehicle.

3. The apparatus of claim 1 wherein said rod means is adjustable in length.

* * * * *